United States Patent
Janke et al.

(10) Patent No.: US 7,949,698 B2
(45) Date of Patent: May 24, 2011

(54) CIRCUIT ARRANGEMENT AND METHOD FOR INITIALIZING A RANDOM NUMBER GENERATOR

(75) Inventors: Marcus Janke, Munich (DE); Peter Laackmann, Munich (DE)

(73) Assignee: Infineon Technologies AG (DE)

( * ) Notice: Subject to any disclaimer, the term of this patent is extended or adjusted under 35 U.S.C. 154(b) by 1176 days.

(21) Appl. No.: 11/548,935

(22) Filed: Oct. 12, 2006

(65) Prior Publication Data

US 2007/0130240 A1   Jun. 7, 2007

(30) Foreign Application Priority Data

Jun. 23, 2005   (DE) .......................... 10 2006 028 944

(51) Int. Cl.
*G06F 1/02* (2006.01)

(52) U.S. Cl. ....................................................... 708/250

(58) Field of Classification Search ........... 708/250–256
See application file for complete search history.

(56) References Cited

U.S. PATENT DOCUMENTS

| | | | | |
|---|---|---|---|---|
| 6,009,135 A | * | 12/1999 | Ozluturk | 375/377 |
| 6,044,388 A | * | 3/2000 | DeBellis et al. | 708/254 |
| 6,195,724 B1 | * | 2/2001 | Stracovsky et al. | 710/244 |
| 6,647,054 B1 | * | 11/2003 | Greenhoe | 375/140 |
| 6,968,460 B1 | * | 11/2005 | Gulick | 708/250 |
| 7,526,794 B2 | * | 4/2009 | Chand et al. | 726/2 |
| 7,533,307 B2 | * | 5/2009 | Laackmann et al. | 714/708 |
| 2004/0130466 A1 | * | 7/2004 | Lu | 708/252 |
| 2005/0120065 A1 | * | 6/2005 | Dirscherl et al. | 708/250 |
| 2005/0129247 A1 | * | 6/2005 | Gammel et al. | 380/286 |
| 2006/0064448 A1 | * | 3/2006 | Henry et al. | 708/250 |
| 2006/0235917 A1 | * | 10/2006 | Manber | 708/250 |

FOREIGN PATENT DOCUMENTS

DE            103 44 327            6/2005

* cited by examiner

*Primary Examiner* — Chat C Do
(74) *Attorney, Agent, or Firm* — Dickstein Shapiro LLP

(57) ABSTRACT

A circuit arrangement for initializing a random number generator includes a volatile random access memory and an access device for storing and reading information in the random access memory. The information is read out from at least one area of the random access memory as a starting value or read out and transformed into a starting value. Furthermore, the circuit arrangement includes a switching device which is coupled to the access device and decouples the random access memory for a period of time from a supply voltage or a refresh signal. The random number generator is coupled to the access device and generates a random number sequence based on the starting value provided by the access device.

32 Claims, 2 Drawing Sheets

CIRCUIT ARRANGEMENT AND METHOD FOR INITIALIZING A RANDOM NUMBER GENERATOR

CROSS REFERENCE TO RELATED APPLICATION

This application claims priority to German Patent Application Serial No. 10 2006 028 944.7, which was filed on Jun. 23, 2006, and is incorporated herein by reference in its entirety.

TECHNICAL FIELD

The invention relates to a circuit arrangement and to a method for initializing a random number generator.

BACKGROUND OF THE INVENTION

Random numbers are also used in security-related circuit arrangements, but not exclusively. In such a circuit arrangement they are used, for example, as test signals for transmission via dummy lines or via active shield conductors, or to mask the operation of the circuit arrangement. Random numbers are also used for cryptographic purposes.

The generation of genuine random numbers based on a random process as occur, for example, in noise processes, is very complex. Random number generators constructed correspondingly are called "genuine" random number generators. Conventional genuine random number generators require the existence of analog circuit elements, the implementation of which in mainly digital circuits, however, is often avoided because of the expenditure.

In order to be able to generate unpredictable random number sequences, nevertheless, so-called pseudo random number generators are used. The random number sequences generated by pseudo random number generators are not genuine, that is to say random number sequences but sequences reproducibly generating an algorithm, with the statistical characteristics of genuine random number sequences.

However, pseudo random number sequences can be used like genuine random number sequences as long as the generating algorithm cannot be determined by outsiders. However, this is frequently the case because the knowledge of a long pseudo random number sequence or, particularly, of a starting value for the random number generator allows the algorithm, and thus the following pseudo random number values to be inferred. The knowledge of the algorithm and thus of the pseudo random number sequence generated by it then makes it possible to attack the circuit arrangement in order to, for example, decrypt encrypted data.

To prevent the pseudo random number sequence from being predictable by an attacker, the starting value of the pseudo random number generator should be unknown. The starting value should be unknown even to the manufacturer since the manufacturer otherwise would have the possibility of attacking the circuit arrangement at the user's promises or to facilitate the attack for a third party by revealing the starting value.

A possible approach for generating an unknown starting value is to generate this starting value internally in the circuit by another random number generator. If it is intended to avoid genuine random number generators for this purpose, the same problems occur in the generation of the starting value as the problems described above for generating the actual random number sequence.

SUMMARY OF THE INVENTION

An embodiment of the circuit arrangement for initializing a random number generator includes a volatile random access memory, a connection for providing a supply voltage, and a switching device to decouple at least one area of the random access memory for a period of time from the connection for providing the supply voltage. The circuit arrangement also includes an access device, which is coupled to the random access memory and the switching device, for storing and reading information in the random access memory, wherein the access device reads out information as a starting value from the at least one area of the random access memory or reads out the information and transforms the information read out into the starting value. The circuit arrangement also includes a random number generator, which is coupled to the access device, for generating a random number sequence based on the starting value.

An alternative embodiment of a circuit arrangement for initializing a random number generator including a volatile random access memory, a means for providing a refresh signal which is applied to the random access memory in order to maintain the storage of information in at least one area of the random access memory, and an access device for storing and reading information in the random access memory. The access device is coupled to the random access memory and reads information out from the at least one area of the random access memory as a starting value or reads out information from at least one area of the random access memory and transforms the information read out into the starting value. The circuit arrangement also includes a switching device for deactivating the provision of the refresh signal during a period of time. Furthermore, the circuit arrangement includes a random number generator, which is coupled to the access device and generates a random number sequence based on the starting value.

A method embodiment for initializing a random number generator by means of a volatile random access memory, wherein information is stored in at least one area of the volatile random access memory. The method includes interrupting a supply voltage for the at least one area of the random access memory during a period of time, reading out information from the at least one area of the random access memory, and providing the information read out as a starting value for the random number generator or transforming the information read out into a starting value and providing the starting value for the random number generator.

An alternative method embodiment includes interrupting the provision of an information-receiving signal for the at least one area of the random access memory during a period of time, reading out information from the at least one area of the random access memory, and providing the information read out as a starting value for the random number generator or transforming the information read out into a starting value and providing the starting value for the random number generator.

BRIEF DESCRIPTION OF THE DRAWINGS

In the text which follows, the invention will be illustrated with reference to exemplary embodiments.

DETAILED DESCRIPTION OF THE EXEMPLARY EMBODIMENTS

Figure 1:
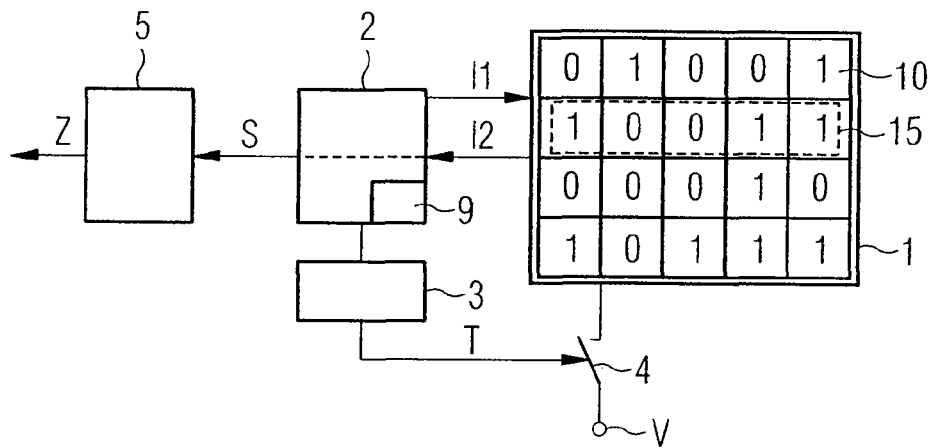
FIG. 1 shows a first exemplary embodiment of a circuit arrangement.

FIG. 1 shows as a first exemplary embodiment a schematic circuit diagram of a circuit arrangement comprising a volatile random access memory 1. Such a circuit arrangement can comprise, for example, a security controller which, in addition to the volatile random access memory 1 which, for example, is constructed as SRAM, also comprises a central processing unit and various peripheral modules. The security controller can be arranged integrated as a chip.

The random access memory 1 comprises a multiplicity of storage locations 10 in which one bit can be stored in each case. For the sake of clarity, the representation in FIG. 1 is restricted to a very small number of storage locations 10.

The circuit arrangement also comprises an access device 2 in order to write predetermined information I1 into the volatile random access memory 1. The predetermined information I1 is stored in a register 9. This is appropriate if a bit pattern is to be written into the random access memory 1. If, in contrast, the same bit is to be stored in each storage location 10, this register 9 can be omitted and a corresponding routine can be executed so that the memory contains, for example, only "0" bits. The access device 2 is also constructed for reading out information provided in the random access memory 1, here identified as I2.

The predetermined information I1 can be written into all storage locations 10 of the random access memory 1 or only into a part-area 15, for example of the size of one segment or of one or more words, respectively.

It is also conceivable to construct the random access memory 1 in such a manner that when operation is started, the random access memory 1 is initialized in such a manner that a predetermined information pattern, comprising, for example, only the "1" bits, is stored in the random access memory 1. In this case, the writing step mentioned above is not required.

During the reading-out, the information I2 is read out of the part-area 15 in which the predetermined information I1 has first been stored. The predetermined stored information I1 and the information read out I2 are thus identical if no bits have been inverted. This is usually the case as long as the random access memory 1 is coupled to a connection for voltage supply with the supply voltage V. The supply voltage V can be decoupled by a switch 4.

It is also conceivable to arrange the random access memory 1 in such a manner that only the area 15, in which the predetermined information I1 has been stored, is decoupled from the supply voltage V. The circuitry of this embodiment is more complex.

In normal operation, the access device 2 accesses the random access memory 1 so that data are read out for data processing and are stored there after the completed data processing. In normal operation, the random access memory 1 is used as a working memory.

The circuit arrangement also comprises a switching device 3 in order to drive the switch 4 for interrupting the supply voltage V. In the exemplary embodiment shown here, the switching device 3 is arranged in such a manner that the supply voltage V is interrupted for a predetermined period T.

The circuit arrangement also comprises a random number generator 5 at the input of which a starting value S provided by the access device 2 is present. The random number generator 5 is constructed for generating a random number sequence Z in dependence on the starting value S.

It should be noted that, when a "random number generator" and "random number sequences" are mentioned, the embodiments relate to a pseudo random number generator which generates a pseudo random number sequence from the starting value by using an algorithm.

In order to initialize the random number generator 5, the predetermined information I1 is first written into the random access memory 1. In the simplest case, the same bit, either "0" or "1", is always written into each memory cell. However, it is also conceivable to use another predetermined pattern, for example a sequence of alternating "0" and "1" bits or a predetermined sequence of bits which is stored in the register 9.

As long as the random access memory 1 is coupled to the supply voltage V, no data losses occur. When the power supply is switched off or, respectively, the supply voltage V is decoupled for the period T, the stability of the information stored in the random access memory 1 is no longer guaranteed.

As a rule, switching off of the supply voltage does not lead to a sudden total loss of data but the binary value of a bit is no longer stable and can change. This process is also called "inverting" of a bit. The probability of this increases with increasing time from the interruption of the voltage supply so that an increasing number of bits is inverted. This process is random because it can not be predicted when the individual bit will be inverted.

The stored predetermined information disappears with increasing time since an increasing number of bits is inverted. As more time passes since the decoupling of the supply voltage, the predetermined information disappears more and more and the randomness of the information provided in the random access memory increases.

This effect causes the bits in the random access memory 1 to change. These bits cannot be directly detected from the outside. They also do not directly depend on environmental parameters. Influences such as temperature or the supply voltage only change the speed at which the predetermined information disappears. When the chip is cooled off severely, for example with liquid nitrogen, the number of inverted bits is less than if the same period were coupled with normal environmental temperature. At high temperatures, the number of inverted bits is clearly increased in comparison with the normal environmental temperature, the decoupling period being the same. The bit pattern produced by this effect in the random access memory 1 is not predictable.

When the supply voltage V is coupled to the random access memory 1 again, the bit states assumed in the period T in which the supply voltage V was decoupled are retained. These states are read out by means of the access device 2. The access device 2 reads out the information I2 changed by the decoupling.

In the exemplary embodiment shown in FIG. 1, an area 15 of the random access memory 1 is read out and the information I2 read out from the access device 2 is provided as a starting value S to the pseudo random number generator 5. The pseudo random number generator 5 generates a random number sequence Z on the basis of this starting value.

In the present exemplary embodiment, the random number generator 5 is reinitialized with each start of operation. Naturally, it is conceivable to reinitialize it during operation too.

Figure 5:
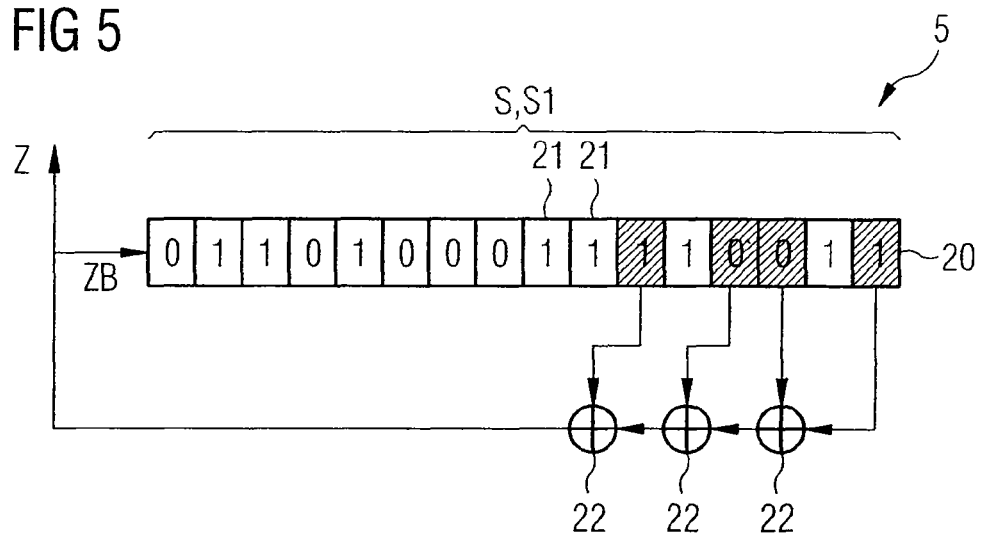
FIG. 5 shows a shift register with feedback as pseudo random number generator.

FIG. 5 illustrates the operation of a typical pseudo random number generator 5 which is constructed as feedback shift register 20.

The shift register 20 comprises a multiplicity of register spaces 21 in which one bit is stored in each case. Some of the register spaces 21, shown shaded in FIG. 5, are tapped and linked to one another via EXCLUSIVE OR operations 22. The resultant bit ZB is a bit of the random number sequence Z. This bit ZB is shifted left into the shift register 20 so that the bits already located there are shifted to the right by one position. The bit on the extreme right is shifted out of the shift register 20. It should be noted that length and taps of the shift register 20 are shown by way of example. The expert has adequate knowledge of shift registers of various lengths with suitable taps.

The next bit ZB of the random number sequence Z is generated in exactly the same manner. With each clock pulse, a new bit ZB of the random number sequence Z is generated by the feedback shift register. It is also conceivable to use the bit shifted out for the random number sequence.

In order to initialize the shift register 20, the bit pattern of the starting value S is loaded into the register spaces 21.

Each bit of the random number sequence Z depends on the bits located in the shift register. The random number sequence is repeated as soon as the starting state S is again in the shift register 20. Since the sequences can be very long, ideally $2^n-1$ bits where n is the length of the shift register before they repeat, it is scarcely possible to infer the state of the shift register, and thus the subsequent bits, from knowledge of the random number sequence Z output with a few bits.

Figure 2:
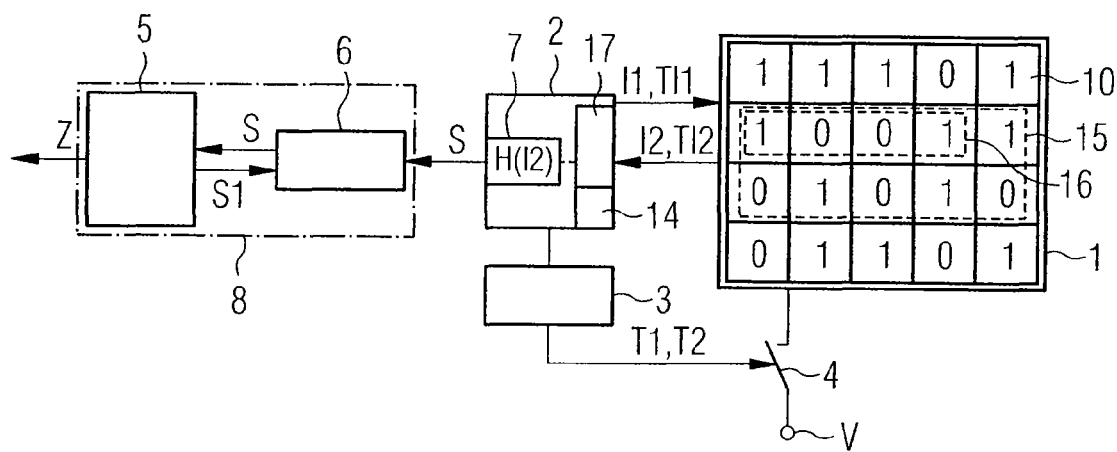
FIG. 2 shows a second exemplary embodiment of the circuit arrangement.

FIG. 2 shows a second exemplary embodiment of a circuit arrangement as a schematic circuit diagram.

Identical reference symbols identify identical arrangement features. To avoid repetitions, the differences are essentially discussed.

In FIG. 2, a random number generator arrangement 8 is provided which comprises the actual random number generator 5 and a memory device 6. The memory device 6, preceding the random number generator 5, is coupled to the access device 2.

In this arrangement the starting value S is provided by the access device 2 to the memory device 6 and is stored in the latter. The random number generator 5 loads the starting value S from the memory device 6 into the random number generator 5 as a starting state. The state changes during the generation of the random number sequence Z. During the operation of the circuit arrangement, the current state remains in the shift register in order to be able to generate a further random number sequence in dependence thereon. Before the circuit arrangement is turned off, the current state, i.e. the bit pattern S1 in the shift register is stored in the memory device 6 in order to be provided as a starting value S for the random number generator when the circuit arrangement is started next. The memory device 6 is arranged as a nonvolatile memory so that the starting value S needs to be generated by the random access memory 1 only when the circuit arrangement is in operation. However, a special procedure or a so-called reset can be provided in order to perform the generation of the starting value S by means of the random access memory 1 again at predetermined times or times selected by the user.

In the present exemplary embodiment, the access device 2 comprises a transformation device 7 which is constructed for generating the starting value S from the information I2 read out. For the generation, a hash transformation H is used which generates from the large number of bits of the information I2 read out the number of bits needed as a starting value. A different selecting or compressing function is also conceivable. In this manner, the quality or randomness, respectively, of the starting value S can be increased since the area 15, and thus also the number of storage locations from which the starting value S is generated, goes beyond the number of bits needed for the starting value S.

The access device 2 also comprises a comparison device 17 which is constructed for checking a predetermined test information item TI1 and a test information item TI2 read out for a predetermined relationship. The predetermined test information item TI1 is stored in an area 16 of the random access memory 1 and read out again from there after the supply voltage V is decoupled. This area 16 can be a part of the area 15 in which the predetermined information I1 is stored. The two areas 15, 16 can correspond wholly or not at all. It is only required that the areas 15, 16 can be decoupled from the supply voltage V in the same manner. This check in the comparison device 17 enables the quality of the starting value S to be ensured. In the present exemplary embodiment, in contrast to that shown in FIG. 1, no register is provided for providing the predetermined information I1. The same bit, e.g. "0", can be stored in all memory locations 10 by means of a deleting procedure. The predetermined information I1 and the predetermined test information item IT1 thus comprises a sequence of "0" bits.

The quality of the information I2 read out for the starting value S can be assessed by means of the difference between the predetermined information I1 and the information I2 read out by means of the so-called Hamming distance. This specifies the number of positions in which two binary bit sequences differ from one another. The Hamming distance between the sequence "01001 10011 00010 10111" as shown in FIG. 1 in the random access memory 1, and the sequence "11101 10011 01010 01101" as shown in FIG. 2 in the random access memory 1, is 6.

The aim should be that the Hamming distance of the test information item I2 read out and the predetermined test information item I1 does not drop below a predetermined value. Although similar starting values for a feedback shift register are not at all associated with similar random number sequences Z generated from these, the quantity of possible starting values drops with a low Hamming distance because the information I2 read out differs from the predetermined information I1 by only a few bits. This can encourage an attack.

If the predetermined Hamming distance has not been achieved by a single decoupling, the loss of information in the memory cells 10 is continued by further decoupling steps until a sufficient change in the memory content of the random access memory 1 has taken place. For this purpose, the random access memory 1 is again supplied with current for a short time and the Hamming weight between predetermined the test information item TI1 and the test information item TI2 read out is determined. In this procedure, only the decoupling and checking step are repeated. The period T1, T2 of the decoupling steps can be identical or can vary.

As an alternative, the predetermined information I1 can be repeatedly stored, decoupled and checked in the random access memory 1. In this case, the period of the decoupling step can be predetermined. In this case, the predetermined period must be selected in such a manner that the quality criterion is usually met so that only runaways which happen to have too few inverted bits are detected by the checking step. As an alternative, it is also conceivable that the period of the decoupling steps is extended with increasing repetition of the steps in order to approach the required quality criterion step by step.

It is possible to consider the information I2 read out as a test information item TI2 for the checking. In this case, no further read-out step is required after the successful checking. It is also possible to use for the checking a test information item from a smaller area 16 than the area 15 in which the information I2 read out for the starting value S is stored, or from an area extending beyond this or from another area or from the entire random access memory 1.

The determination of the Hamming distance of the bit sequence from the area to be checked should only supply an indication of the extent to which the loss of information has proceeded in the random access memory 1. A small sample, for example the first eight bytes in the random access memory 1, is sufficient for the evaluation. If this sample meets the quality criterion, the information I2 to be read out is read out.

As an alternative, the randomness of the sample can be determined by means of the so-called Hamming weight. The Hamming weight is the number of a binary value issued, usually "1" in a bit sequence. The Hamming weight is thus the Hamming distance of an empty word, a sequence of "0" bits, and equivalent to the number of the "1" bits set. The bit sequence "11101 10011 01010 01101" which is represented in the random access memory 1 of FIG. 2, thus has the Hamming weight 12.

If only the "0" bits are written as predetermined information into the random access memory, the quality of the information I2 read out can be determined in advance by determining the Hamming weight of a sample as described above. Naturally, the Hamming weight of the information I2 read out from the area 15 or the entire random access memory 1 can also be used as quality criterion.

Figure 3:
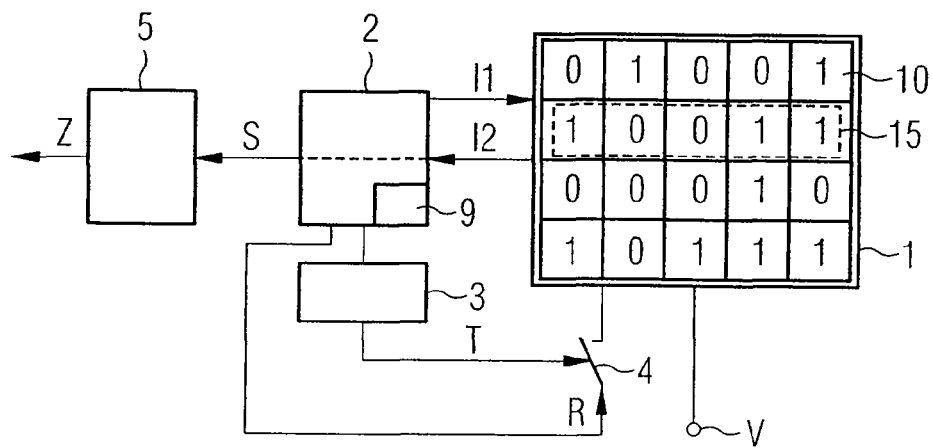
FIG. 3 shows a third exemplary embodiment of the circuit arrangement.
Figure 4:
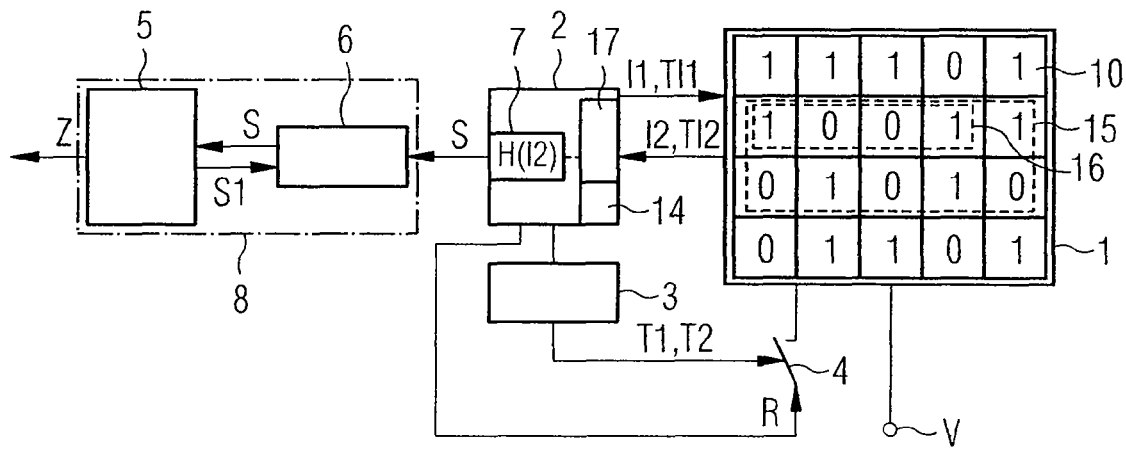
FIG. 4 shows a fourth exemplary embodiment of the circuit arrangement.

FIGS. 3 and 4 show a third and fourth, respectively, exemplary embodiment in which the random access memory 1 is constructed as DRAM. To avoid repetitions, only the differences between the exemplary embodiments of FIGS. 1 and 3 and between the exemplary embodiments of FIGS. 2 and 4 will be discussed in the text which follows. The supply voltage V for the DRAM 1 cannot be decoupled by the switching device 4 but feeds the random access memory 1 continuously. Furthermore, a refresh signal R, which is provided by the access device 2 and can be coupled to the DRAM 1, is in each case provided in the third and fourth exemplary embodiments which are shown in FIGS. 3 and 4, respectively, in order to control regular refreshing of the memory content by circuits internal to the memory, which is basically required in this type of memory. If the provision of the refresh signal R is interrupted, no refreshing takes place and the stored information disappears.

The switching device 3 is constructed for interrupting the provision of the refresh signal R as is indicated by the switch 4 controlled by the switching device 3, which can interrupt the supply of the refresh signal R to the random access memory 1.

It should be pointed out that the features of the exemplary embodiments of FIGS. 1, 2, 3 and 4 can be combined. In the exemplary embodiments, the interruption of the supply voltage is advantageous for a static RAM, also called SRAM, in which the stored information disappears when the supply voltage is decoupled.

Interrupting the information-receiving signal is advantageous for a dynamic RAM, or DRAM, in which the information-retaining signal, also called refresh signal, is provided in order to control the regular refreshing of the memory content by circuits internal to the memory, which is basically required in this type of memory. When the provision of the signal is interrupted, the refreshing does not take place and the stored information disappears. Deactivation can be performed by means of a deactivating means which decouples the information-retaining signal from the random access memory, which suppresses the information-retaining signal.

The advantage of this exemplary embodiment is that the random access memory actually provided as working memory is used for generating the starting value for the random number generator. This exemplary embodiment can be implemented with little additional circuit expenditure. It can be used sparingly in security controllers in the chip card domain.

It is possible, by means of the exemplary embodiments described and the corresponding methods for operating, to provide random numbers without there being a theoretical possibility that the manufacturer of the security controller can precalculate these random numbers by also knowing the starting value in addition to the algorithm.

When the power supply or voltage supply of the random access memory is switched off, which is constructed, for example, as RAM (Random Access Memory) chip or memory module, the stored information disappears after a certain time.

The volatility of the information stored in the random access memory when the supply voltage is interrupted is utilized for generating a random value as basis for the starting value of the random number generator internally in the circuit.

The access device advantageously comprises a transformation device in order to generate from a large number of random bits the starting value which has much fewer bits, by means of a compressing or selecting function, for example a hash function. In this manner, more random bits from the random access memory are included in the starting value than when only the information read out is provided as a starting value.

In an advantageous embodiment, the random number generator is initialized with a new starting value with each start of the circuit arrangement. This increases the security.

In an alternative embodiment the actual random number generator is preceded by a memory device in order to store the starting value. In this embodiment, the starting value is generated only once, for example only during the production or when the circuit arrangement is in operation, by means of the random access memory and stored in the memory device. The random number generator stores a new starting value in the memory device in dependence on the random number sequence generated by means of this first starting value so that the random numbers will neither be repeated during a restart of the circuit arrangement nor time be lost due to the generation of the starting value.

Advantageously, a predetermined information item is written into the random access memory before the decoupling so that it is possible to determine from the number of inverted bits in order to infer the quality of the starting value from this.

In an advantageous embodiment, a comparison device is constructed for checking whether a predetermined test information item and a test information item read out are in a predetermined relationship to one another. The test information item read out is read out of the same memory area in which the predetermined test information item has been stored before the decoupling of the supply voltage. They differ due to the inverted bits. The area from which the test information item is read out, and the area from which the information for the starting value is read out, can correspond at least partially, or differ from one another wholly.

Due to the fact that the access device is provided with the comparison device, the quality of the random number sequence can be checked. For example, it is possible to check by comparing the predetermined test information item and the test information item read out whether bits have been inverted to an adequate extent so that it can be assumed that the information read out is sufficiently decorrelated and random to be used as the basis for a starting value.

In an embodiment which can be implemented in a simple manner, the period during which the supply voltage is decoupled is predetermined. This can be achieved, for example, in a simple manner by means of a counter or an RC section. If this period is long enough, it is possible to ensure by these means that usually sufficient bits will be inverted so that the information read out is sufficiently random.

In order to achieve a predetermined quality of the information read out, the comparison device, in an advantageous embodiment, is constructed in such a manner that it controls the decoupling of the supply voltage until the predetermined test information item and the test information item read out are in the predetermined relationship to one another. This may be the case, for example, if one half of the test information item has been lost or one half of the bits has been inverted.

In an alternative embodiment, decoupling and checking steps can alternate so that the quality of the information read out as a starting value is improved step by step.

In an embodiment which can be implemented in a particularly simple manner, the entire random access memory can be decoupled from the supply voltage.

A suitable embodiment utilizes the Hamming distance as criterion for checking the predetermined relationship. In this embodiment, the number of bits in which the predetermined test information item and the test information item read out differ from one another are compared.

Assuming that the predetermined information only comprises identical bits, the Hamming weight of the test information item read out, which specifies the number of bits which have been inverted, can be used as a quality criterion.

With regard to the method, an advantage of an exemplary embodiment is that the random number generator is provided with a genuine random number value based on the information loss effect of the volatile random access memory, as a starting value which renders the predictability of the generated random number sequence impossible for an attacker.

To improve the quality of the starting value further, a larger number of bits than is actually needed as a starting value can be used as information read out. The information read out is transformed into the starting value having the required number of bits by means of a compressing or selecting function. An example of such a compressing or selecting function is a hash function.

To check the quality of the information read out, the predetermined test information item and the test information item read out are checked with regard to a predetermined relationship after the decoupling and before the provision.

This check can be omitted if the duration of the decoupling period is predetermined in such a manner that it can be assumed that a sufficient number of bits has been inverted so that the information read out is sufficiently random and decorrelated. However, attention must be paid in the case of the predetermined decoupling period to the fact that its duration must be selected in such a manner that not too many bits have been inverted, either. In this case, all bits would be inverted in the extreme case, as a result of which the information in the random access memory would be predictable again.

In an advantageous embodiment of the method, the storing, the decoupling and the checking are repeated until the predetermined information and the information read out are in a predetermined relationship to one another. In this embodiment, the decoupling period is advantageously varied with each step. In this manner, new bit patterns are generated in the random access memory with each step until the desired quality is achieved.

In an alternative embodiment of the method, the restoring can be omitted. With each decoupling step, more and more bits are inverted. The decoupling and the checking are repeated until the test information item read out and the predetermined test information item are in the predetermined relationship to one another.

In this embodiment of the method, too, the duration of the decoupling steps can be varied in order to approach the predetermined quality criterion step by step.

The advantages of the Hamming distance or of the Hamming weight can also be used as quality criterion in the method.

What is claimed is:

1. A circuit arrangement for initializing a random number generator, comprising:
    a volatile random access memory;
    a connection configured to provide a supply voltage;
    a switching device configured to decouple at least one area of the random access memory for a predetermined period of time from the connection for providing the supply voltage, wherein randomness of information stored in the random access memory increases with increasing time;
    an access device, which is coupled to the random access memory and the switching device, configured to store and read information in the random access memory, wherein the access device reads out information as a starting value from the at least one area of the random access memory or reads out the information and transforms the information read out into the starting value; and
    a random number generator, which is coupled to the access device, and is configured to generate a random number sequence based on the starting value.

2. The circuit arrangement as claimed in claim 1, wherein the access device is configured to store a predetermined information item in the at least one area of the random access memory.

3. The circuit arrangement as claimed in claim 1, further comprising a transformation device configured to transform the information read out into the starting value via a compressing or selecting function.

4. The circuit arrangement as claimed in claim 1, wherein the random number generator comprises a memory device configured to store the starting value.

5. The circuit arrangement as claimed in claim 4, wherein the random number generator is configured to change the starting value and store the changed starting value in the memory device.

6. The circuit arrangement as claimed in claim 1, wherein the access device comprises a comparison device configured to check whether a predetermined test information item, which can be stored in an area of the random access memory by the access device, and a test information item, which can be read out of the area by the access device, are in a predetermined relationship to one another.

7. The circuit arrangement as claimed in claim 6, wherein the comparison device is configured to drive the switching device such that the supply voltage is decoupled in a stepwise manner until the predetermined test information item and the test information item read out are in the predetermined relationship to one another.

8. The circuit arrangement as claimed in claim 6, wherein the test information item read out comprises a bit sequence, and the comparison device is configured to determine the Hamming weight of the bit sequence read out and check whether the Hamming weight is within a predetermined range.

9. The circuit arrangement as claimed in claim 6, wherein the predetermined test information item and the test information item read out in each case comprise a bit sequence, and the comparison device is configured to determine the Hamming distance between the bit sequence of the predetermined test information item and the bit sequence of the test information item read out and check whether the Hamming distance is within a predetermined range.

10. A circuit arrangement for initializing a random number generator, comprising:
    a volatile random access memory;
    a means for providing a refresh signal which is applied to the random access memory in order to maintain storage of information in at least one area of the random access memory;
    an access device, which is coupled to the random access memory, and is configured to store and read information in the random access memory, wherein the access device reads out information from the at least one area of the random access memory as a starting value or reads out information from at least one area of the random access memory and transforms the information read out into the starting value;
    a switching device configured to deactivate the provision of the refresh signal for a predetermined period of time, wherein randomness of information stored in the volatile random access memory increases with increasing time; and
    a random number generator, which is coupled to the access device, and is configured to generate a random number sequence based on the starting value.

11. The circuit arrangement as claimed in claim 10, wherein the access device is configured to store a predetermined information item in the at least one area of the random access memory.

12. The circuit arrangement as claimed in claim 10, wherein a transformation device is configured to transform the information read out into the starting value via a compressing or selecting function.

13. The circuit arrangement as claimed in claim 10, wherein the random number generator comprises a memory device configured to store the starting value.

14. The circuit arrangement as claimed in claim 13, wherein the random number generator is configured to change the starting value and store the changed starting value in the memory device.

15. The circuit arrangement as claimed in claim 10, wherein the access device comprises a comparison device configured to check whether a predetermined test information item, which can be stored in an area of the random access memory by the access device, and a test information item, which can be read out of the area by the access device, are in a predetermined relationship to one another.

16. The circuit arrangement as claimed in claim 15, wherein the comparison device is configured to drive the switching device such that the supply voltage is decoupled in a step-wise manner until the predetermined test information item and the test information item read out are in the predetermined relationship to one another.

17. The circuit arrangement as claimed in claim 15, wherein the test information item read out comprises a test bit sequence, and the comparison device is configured to determine the Hamming weight of the bit sequence read out and to check whether the Hamming weight is within a predetermined range.

18. The circuit arrangement as claimed in claim 15, wherein the predetermined test information item and the test information item read out in each case comprise a bit sequence, and the comparison device is configured to determine the Hamming distance between the bit sequence of the predetermined test information item and the bit sequence of the test information item read out and check whether the Hamming distance is within a predetermined range.

19. A method for initializing a random number generator by means of a volatile random access memory, wherein information is stored in at least one area of the volatile random access memory, the method comprising:
    decoupling a supply voltage for the at least one area of the random access memory for a predetermined period of time, wherein randomness of information stored in the random access memory increases with increasing time;
    reading out information from the at least one area of the random access memory; and
    providing the information read out as a starting value for the random number generator or transforming the information read out into a starting value and providing the starting value for the random number generator to generate a random number.

20. The method as claimed in claim 19, wherein a compressing or selecting function is used for the transforming.

21. The method as claimed in claim 19, further comprising:
    before the step of decoupling, writing a predetermined test information item into an area of the random access memory; and
    after the step of decoupling, reading the test information item out of the area and checking whether the predetermined test information item and the test information item read out are in a predetermined relationship to one another.

22. The method as claimed in claim 21, wherein at least the decoupling, the reading out of the test information item, and the checking of the test information item are repeated until the predetermined test information item and the test information item read out are in the predetermined relationship to one another.

23. The method as claimed in claim 21, wherein the reading out of the test information item comprises the reading out of the information.

24. The method as claimed in claim 21, wherein the predetermined test information item and the test information item read out in each case comprise a bit sequence, and wherein the checking step comprises:
    determining the Hamming weight of the bit sequence of the test information item read out, and checking whether the Hamming weight is within a predetermined range; or
    determining the Hamming distance between the bit sequence of the predetermined test information item and the bit sequence of the test information item read out, and checking whether the Hamming distance is within a predetermined range.

25. A method for initializing a random number generator by means of a volatile random access memory, wherein information is stored in at least one area of the volatile random access memory, the method comprising:
    decoupling provision of an information-receiving signal for the at least one area of the random access memory a predetermined period of time, wherein randomness of information stored in the random access memory increases with increasing time;
    reading out information from the at least one area of the random access memory; and
    providing the information read out as a starting value for the random number generator or transforming the information read out into a starting value and providing the starting value for the random number generator to generate a random number.

26. The method as claimed in claim 25, wherein a compressing or selecting function is used for the transforming.

27. The method as claimed in claim 25, wherein
before the step of decoupling, writing a predetermined test information item into an area of the random access memory; and
after the step of decoupling, reading the test information item is read out of the area and checking whether the predetermined test information item and the test information item read out are in a predetermined relationship to one another.

28. The method as claimed in claim 27, wherein at least the decoupling, the reading out of the test information item, and the checking of the test information item are repeated until the predetermined test information item and the test information item read out are in the predetermined relationship to one another.

29. The method as claimed in claim 27, wherein the reading out of the test information item comprises the reading out of the information.

30. The method as claimed in claim 27, wherein the predetermined test information item and the test information item read out in each case comprise a bit sequence, and
wherein the checking step comprises:
determining the Hamming weight of the bit sequence of the test information item read out, and checking whether the Hamming weight is within a predetermined range; or determining the Hamming distance between the bit sequence of the predetermined test information item and the bit sequence of the test information item read out, and s checking whether the Hamming distance is within a predetermined range.

31. A circuit arrangement for initializing a random number generator by means of a volatile random access memory, wherein information is stored in at least one area of the volatile random access memory, the circuit arrangement comprising:
means for decoupling a supply voltage for the at least one area of the random access memory for a predetermined period of time, wherein randomness of information stored in the random access memory increases with increasing time;
means for reading out information from the at least one area of the random access memory; and
means for providing the information read out as a starting value for the random number generator or transforming the information read out into a starting value and providing the starting value for the random number generator to generate a random number.

32. A circuit arrangement for initializing a random number generator by means of a volatile random access memory, wherein information is stored in at least one area of the volatile random access memory, the circuit arrangement comprising:
means for decoupling provision of an information-receiving signal for the at least one area of the random access memory for a predetermined period of time, wherein randomness of information stored in the random access memory increases with increasing time;
means for reading out information from the at least one area of the random access memory; and
means for providing the information read out as a starting value for the random number generator or transforming the information read out into a starting value and providing the starting value for the random number generator to generate a random number.

* * * * *

UNITED STATES PATENT AND TRADEMARK OFFICE
CERTIFICATE OF CORRECTION

PATENT NO. : 7,949,698 B2  
APPLICATION NO. : 11/548935  
DATED : May 24, 2011  
INVENTOR(S) : Marcus Janke et al.

Page 1 of 1

It is certified that error appears in the above-identified patent and that said Letters Patent is hereby corrected as shown below:

On the Title Page

Item (30) Under Foreign Application Priority Data, please delete "Jun. 23, 2005 (DE) 10 2006 028 944" and insert -- Jun. 23, 2006 (DE) 10 2006 028 944 --, therefor.

Signed and Sealed this
Twenty-fifth Day of October, 2011

David J. Kappos
*Director of the United States Patent and Trademark Office*